(12) United States Patent
Choi

(10) Patent No.: US 12,316,774 B2
(45) Date of Patent: May 27, 2025

(54) INFORMATION LEAKAGE MITIGATION ASSOCIATED WITH ELLIPTIC CURVE OPERATIONS

(71) Applicant: Lattice Semiconductor Corporation, Hillsboro, OR (US)

(72) Inventor: Hoon Choi, Mountain View, CA (US)

(73) Assignee: Lattice Semiconductor Corporation, Hillsboro, OR (US)

( * ) Notice: Subject to any disclaimer, the term of this patent is extended or adjusted under 35 U.S.C. 154(b) by 182 days.

(21) Appl. No.: 17/960,734

(22) Filed: Oct. 5, 2022

(65) Prior Publication Data

US 2023/0044442 A1 Feb. 9, 2023

Related U.S. Application Data

(63) Continuation of application No. PCT/US2021/025834, filed on Apr. 5, 2021.

(60) Provisional application No. 63/006,010, filed on Apr. 6, 2020.

(51) Int. Cl.
*H04L 9/08* (2006.01)
*H04L 9/30* (2006.01)
*H04L 9/32* (2006.01)

(52) U.S. Cl.
CPC .......... *H04L 9/3252* (2013.01); *H04L 9/0825* (2013.01); *H04L 9/3066* (2013.01)

(58) Field of Classification Search
CPC ... H04L 9/3252; H04L 9/0825; H04L 9/3066; H04L 9/32; H04L 9/3247; H04L 9/0816; H04L 9/08
See application file for complete search history.

(56) References Cited

U.S. PATENT DOCUMENTS

| | | | |
|---|---|---|---|
| 7,418,099 B2 * | 8/2008 | Vanstone | H04L 9/0894 380/263 |
| 8,472,619 B1 | 6/2013 | Trimberger | |
| 12,113,778 B2 * | 10/2024 | Mulayin | G06F 16/334 |
| 2011/0185177 A1 * | 7/2011 | Spalka | H04L 9/3247 713/171 |
| 2012/0324242 A1 * | 12/2012 | Kirsch | G06Q 20/405 713/189 |
| 2013/0269032 A1 | 10/2013 | Chasko et al. | |
| 2015/0188713 A1 | 7/2015 | Rombouts et al. | |
| 2017/0098089 A1 * | 4/2017 | Stewart | G06F 21/602 |
| 2019/0205507 A1 * | 7/2019 | Antonatos | H04L 63/1416 |
| 2019/0245681 A1 | 8/2019 | Alwen | |
| 2020/0028694 A1 | 1/2020 | Zaverucha | |
| 2020/0314647 A1 * | 10/2020 | Wang | H04L 63/0823 |
| 2021/0028946 A1 * | 1/2021 | Scott | H04L 9/3263 |
| 2022/0248221 A1 * | 8/2022 | Nix | H04W 12/02 |

* cited by examiner

*Primary Examiner* — Quazi Farooqui
(74) *Attorney, Agent, or Firm* — Haynes and Boone, LLP

(57) ABSTRACT

Various techniques are provided to implement information leakage mitigation associated with elliptic curve operations. In one example, a method includes generating second data based on first data. The first data is associated with a message. The second data is associated with a decoy message. The method further includes performing a first elliptic curve operation based on the first data. The method further includes performing a second elliptic curve operation based on the second data. The first elliptic curve operation and the second elliptic curve operation are performed in a random order. Related systems and devices are provided.

18 Claims, 5 Drawing Sheets

$$m_1, r_1, s_1, leak_1$$
$$m_2, r_2, s_2, leak_2$$
$$m_3, r_3, s_3, leak_3$$
$$m_4, r_4, s_4, leak_4$$
$$m_5, r_5, s_5, leak_5$$
$$m_6, r_6, s_6, leak_6$$
$$\vdots$$
$$m_n, r_n, s_n, leak_n$$

```
For each ECDSA generation request with
x (private key) and m (message to sign):

Generate a random number called order
x' = HASH(x), m'=HASH(m) # x' is optional for UDS key
If order[0] == 0:
    r, s  = ECDSA(x, m) # k
    r', s' = ECDSA(x', m') # k'
Else:
    r', s' = ECDSA(x', m') # k'
    r, s  = ECDSA(x, m) #k
Return(r, s)
```

FIG. 3

$m_1, r_1, s_1, leak_{11}, leak_{12}$ $m_2, r_2, s_2, leak_{21}, leak_{22}$ $m_3, r_3, s_3, leak_{31}, leak_{32}$ $m_4, r_4, s_4, leak_{41}, leak_{42}$ $m_5, r_5, s_5, leak_{51}, leak_{52}$ $m_6, r_6, s_6, leak_{61}, leak_{62}$ $\vdots$ $m_n, r_n, s_n, leak_{n1}, leak_{n2}$

FIG. 4

$m_1, r_1, s_1,$ (leak$_{11}$,) leak$_{12}$
$m_2, r_2, s_2,$ leak$_{21}$ (leak$_{22}$)
$m_3, r_3, s_3,$ leak$_{31}$ (leak$_{32}$)
$m_4, r_4, s_4,$ (leak$_{41}$,) leak$_{42}$
$m_5, r_5, s_5,$ (leak$_{51}$,) leak$_{52}$
$m_6, r_6, s_6,$ leak$_{61}$ (leak$_{62}$)
$\vdots$
$m_n, r_n, s_n,$ (leak$_{n1}$,) leak$_{n2}$

FIG. 5

$m_1, r_1, s_1,$ (leak$_{11}$) leak$_{12}$
$m_2, r_2, s_2,$ (leak$_{21}$) leak$_{22}$
$m_3, r_3, s_3,$ (leak$_{31}$) leak$_{32}$
$m_4, r_4, s_4,$ leak$_{41}$ (leak$_{42}$)
$m_5, r_5, s_5,$ (leak$_{51}$,) leak$_{52}$
$m_6, r_6, s_6,$ (leak$_{61}$,) leak$_{62}$
$\vdots$
$m_n, r_n, s_n,$ leak$_{n1}$ (leak$_{n2}$)

FIG. 6

```
For each ECIES decryption request with
x (private key) and R (ephemeral public key):

Generate a random number called order
x' = HASH(x), R'=(2*Rx,2*Ry,Rz)
# x' is optional for UDS key, R' may be not a valid point
If order[0] == 0:
    m  = ECIES(x, R)
    m' = ECIES(x', R')
Else:
    m' = ECIES(x', R')
    m  = ECIES(x, R)
Return(m)
```

INFORMATION LEAKAGE MITIGATION ASSOCIATED WITH ELLIPTIC CURVE OPERATIONS

CROSS-REFERENCE TO RELATED APPLICATION

This patent application is a continuation of International Application No. PCT/US2021/025834, filed Apr. 5, 2021 and entitled "INFORMATION LEAKAGE MITIGATION ASSOCIATED WITH ELLIPTIC CURVE OPERATIONS", which is claimed for the benefit of and incorporated herein by reference in its entirety.

International Application No. PCT/US2021/025834 claims the benefit of and priority to U.S. Provisional Patent Application No. 63/006,010, filed on Apr. 6, 2020 and entitled "Mitigation for Information Leakage During Elliptic Curve Scalar Multiplication Operations," which is incorporated herein by reference in its entirety.

TECHNICAL FIELD

The present invention relates generally to data security and, more particularly, to information leakage mitigation associated with elliptic curve operations.

BACKGROUND

Providing secure transfers of data over intranetworks and internetworks, such as the Internet, has become increasingly important. In some cases, a receiver of a message may verify whether a message is authentic using a signature associated with the message and whether the message has been tampered with after signing.

BRIEF DESCRIPTION OF THE DRAWINGS

FIG. 3 provides pseudocode for facilitating digital signature information leakage mitigation in accordance with an embodiment of the disclosure.

FIG. 4 illustrates information that may be collected by an adversary as part of an attack when the pseudocode of FIG. 3 is implemented in accordance with an embodiment of the disclosure.

FIG. 5 illustrates information that may be collected by an adversary with true leaks circled in accordance with an embodiment of the disclosure.

FIG. 6 illustrates information that may be collected by an adversary with true leaks circled in accordance with an embodiment of the disclosure.

Embodiments of the present disclosure and their advantages are best understood by referring to the detailed description that follows. It should be appreciated that like reference numerals are used to identify like elements illustrated in one or more of the figures.

DETAILED DESCRIPTION

Figures 1, 2:
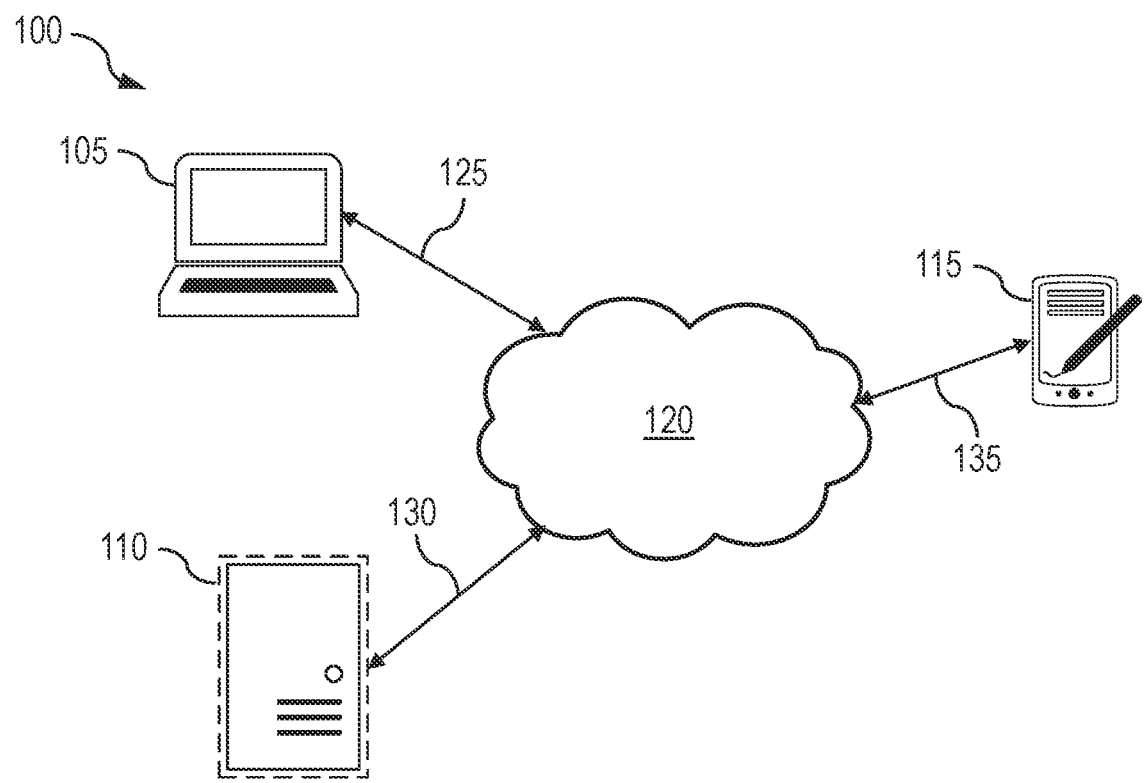
FIG. 1 illustrates an example network environment in which data signatures, data encryption/decryption, and data communication may be implemented in accordance with one or more embodiments of the present disclosure.
FIG. 2 illustrates information that may be collected by an adversary.

Various techniques are provided to facilitate mitigation of information leakage associated with performing elliptic curve (EC) operations. In some aspects, these elliptic curve operations include Elliptic Curve Digital Signature Algorithm (ECDSA) operations and Elliptic Curve Integrated Encryption Scheme (ECIES) operations. The ECDSA and ECIES operations include elliptic curve scalar multiplication (ECSM) operations. For example, a device may perform ECSM operations to multiply a nonce with an elliptic curve base point as part of an ECDSA, as further described herein. The nonce is associated with a secret key (e.g., private key) of the device, with both the nonce and the secret key intended to be kept secret by the device. In some attacks, an adversary (e.g., also referred to as an adversarial device, an attacker, or a hacker) may be able to collect information leaked by the device that is associated with the nonce when the device is performing ECSM operations. Such leaked information associated with the nonce may also translate to information about the secret key. As such, such leaked information, if not mitigated, may allow the adversary to determine the nonce, which in turn may be used to determine the secret key of the attacked device.

In some embodiments, multiple ECSM operations are performed to mitigate/obscure leakage information associated with ECSM operations. In one aspect, such an approach is utilized in ECDSA signing operations. In ECDSA, information leakage about a nonce may occur due to an ECSM operation of the nonce and a curve point. To mitigate information leakage in ECDSA, multiple ECDSA signing operations may be performed for a given message m to be signed, in which only one of the signing operations is associated with a signature (r, s) (e.g., also referred to as the true signature) and a nonce k (e.g., also referred to as the true nonce). The remaining signing operations are associated with decoy signatures (e.g., also referred to as fake signatures or dummy signatures) and leaked information that provide information associated with decoy nonces (e.g., also referred to as fake nonces or dummy nonces). In this regard, information associated with the true nonce and the decoy nonce(s) leaked with each signing operation (e.g., each with a respective message m, returned signature (r, s), and leaked information about k) is not prevented and instead is leveraged to mitigate/obscure determination of the secret key. Such an approach is in contrast to other approaches that may seek to stop information leakage about the nonce k, such as by computational or physical mechanisms. In an embodiment, the approach to utilize multiple ECSM operations (e.g., for each message in ECDSA) may be used alone or together with other approaches, such as approaches that aim to stop information leakage.

The multiple ECSM operations are performed in a random order. The random order may be indicated by one or more random values. Random values may be generated (e.g., by random number generators) with varying entropy levels dependent on application (e.g., desired/necessary level of security for a given application). Higher entropy/randomness is generally associated with higher security. As an example, a true random value may be based on measurement of physical or natural phenomenon (e.g., quantum processes) or sources of natural entropy. These sources or true randomness extraction from these sources may provide true random value generation, but may be rate-limited or slower in speed relative to generation of random values (e.g., referred to as pseudorandom values) associated with lower entropy. In an aspect, a true random value(s) or a pseudorandom value(s) may be used to indicate the random order to perform the multiple ECSM operations in accordance with one or more embodiments.

Using some embodiments, mitigation may be implemented to address side-channel attacks, such as lattice attacks. Side-channel attacks may refer to attacks by the adversary that do not directly involve an attempt at recovering or accessing the attacked device's secret key itself, but instead rely on collecting information leakages (e.g., about a nonce in the case of ECDSA) and determining the secret key based on the collected information leakages. In some cases, such leaks may be determined based on monitoring a power profile of a device when the device is performing an ECSM operation. In some aspects, such mitigation may be implemented in a firmware or software layer (e.g., with other safeguards taken as appropriate), rather than implementing physical or hardware changes. The mitigation may also be applied on top of/in addition to other mitigations and/or countermeasures that may be performed.

Referring now to the drawings, FIG. 1 illustrates an example network environment 100 in which data signatures, data encryption/decryption, and data communication (e.g., transmission, reception) may be implemented in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided.

The network environment 100 includes computing devices 105, 110, and 115 and a network 120. The computing devices 105, 110, and 115 may transmit data (e.g., messages) to and/or receive data from one another. For example, the computing devices 105, 110, and 115 may encrypt data, sign data, transmit encrypted data, decrypt encrypted data, and verify signatures. In an embodiment, the computing devices 105, 110, and/or 115 may perform signing operations (e.g., using ECDSA) and/or encryption/decryption operations (e.g., using ECIES). The computing devices 105, 110, and 115 may communicate via the network 120. In FIG. 1, the computing devices 105, 110, and 115 are connected to the network 120 via respective connections 125, 130, and 135.

Each of the computing devices 105, 110, and 120 may include any system and/or device that is able to establish one or more connections (e.g., wired and/or wireless connection) to communicate with another system and/or device. The computing devices 105, 110, and 115 may include, by way of non-limiting examples, a server, a web server, a cloud-based server, a desktop computer, a point-of-sale device, a laptop computer, a handheld computer, a mobile phone (e.g., smart phone), a computer cluster, a personal digital assistant, a tablet device, or the like. In an embodiment, any one of the computing devices 105, 110, and 115 may perform processes described herein, such as the example processes provided in FIGS. 3, 7, and 8.

The connections 125, 130, and 135 may be utilized for transmitting and receiving data. In some cases, the connections 125, 130, and 135 may be utilized for key exchange for facilitating encryption and decryption of communicated data. For example, to facilitate secure communication between the computing devices 105 and 115, the computing devices 105 and 115 may perform a key exchange to facilitate encryption and decryption of data communicated between the computing devices 105 and 115. Communication associated with the key exchange may be through the connections 125 and 135 and the network 120.

Each of the connections 125, 130, and 135 may represent one or more wired and/or one or wireless connections for facilitating communication between the computing devices 105, 110, and 115. The network 120 may be a network, or any collection of distinct networks operating wholly or partially in conjunction, to provide connectivity to the computing devices 105, 110, and 115 and allow communication of data between the computing devices 105, 110, and 115. For example, the network 120 over which the computing devices 105, 110, and 115 communicate may include, by way of non-limiting examples, the Internet, a telephonic network, a cellular network, a fiber network, a wireless network, a cloud-based network, a point-of-sale network, a private network (e.g., intranet), a local area network (LAN), a wide area network (WAN), a personal area network (PAN), or a combination thereof.

In an embodiment, one or more of the computing devices 105, 110, and/or 115 may be a client device and one or more of the computing devices 105, 110, and/or 115 may be a server device (e.g., a host server). For example, the computing devices 105 and 115 may be client devices and the computing device 110 may be a server device. In this example, the computing device 110 may host a network resource that serves the computing devices 105 and 115. The network resource may include web-based services (e.g., news website), cloud-based services (e.g., data storage services), point-of-sale services, application services, and/or other services. Communications over the network 120 may be client-to-client, client-to-server, server-to-client, and/or server-to-server.

Various techniques are provided to facilitate information leakage mitigation associated with elliptic curve operations. Information leakage may be associated with ECSM operations, which are performed in ECDSAs and ECIESs. ECSM may use a private key both for encryption and for ECDSA. For example, a device may perform ECSM operations to multiply a nonce with an elliptic curve base point as part of an ECDSA, as further described herein. The nonce is associated with the private key, with both the nonce and the private key generally intended to be kept secret by the device. An adversary may be able to collect information leaked by a device that is associated with the nonce when the device is performing ECSM operations. As an example, in FIG. 1, the computing device 105 may be the adversary and the computing device 115 may be the attacked device. Such leaked information associated with the nonce also translates to information about the private key. As such, such leaked information, if not mitigated, may allow the adversary to determine the nonce, which in turn may be used to determine the private key of the attacked device.

In some embodiments, information leakage mitigation may be applied for ECDSAs. To facilitate secure data transfers over intranetworks and/or internetworks, such as the Internet, data transmitted over networks may be signed with a digital signature using digital signature algorithms (DSAs). At a sender side, a sender may use DSAs to apply a signature to a message that is to be transmitted by the sender. At a receiver side, DSAs may be used by a receiver of the message to authenticate that the message originated from an expected origin/sender and to verify that the message was not tampered with after the message was signed. The expected origin/sender of the message is a holder of a private key corresponding to the applied signature (e.g., the private key used to generate the signature associated with the message). Authentication may be based on verification by the receiver of the signature applied by the sender of the message. The receiver may authenticate the message (e.g., verify its signature) and verify the content of the message by using a public key that corresponds with the private key.

ECDSA is a version or type of DSA that uses elliptic curve cryptography (ECC). As one example, Bitcoin uses ECDSA. With respect to ECDSA, ECC involves a scalar multiplication operation referred to as an ECSM operation or an elliptic curve cryptography scalar multiplication operation. ECC uses a key pair formed of a private key x and a public key Q. The public key Q is provided by an ECSM of the private key x and a base point P (e.g., also referred to as an elliptic curve base point) on an elliptic curve over a finite field. This relationship for the public key Q can be written as Q=[x]P. The private key x is random in field $\mathbb{Z}/n\mathbb{Z}$, where $\mathbb{Z}$ is the set of all integers and n is the order of the base point P. In some cases, the private key x may be referred to as a secret key, since the private key x is to be kept secret by a device using the private key for ECDSA signing.

For a message m (e.g., plaintext message), ECDSA may be used to generate a signature (r, s) for signing the message m. In this regard, each run of an ECDSA may be associated with signing a respective message m. Each run of an EDCSA involves selecting/generating a random number nonce k in the field $(\mathbb{Z}/n\mathbb{Z})^*=\{1, \ldots, n-1\}$. The selection may be denoted as $k \xleftarrow{\$} (\mathbb{Z}/n\mathbb{Z})^*$, where $\xleftarrow{\$}$ indicates that the nonce k is assigned a value from a random sampling from the field $(\mathbb{Z}/n\mathbb{Z})^*$. In an aspect, such a random sampling may include a random sampling of varying entropy dependent on application (e.g., desired/necessary level of security for a given application). In this regard, the random sampling may be based on a true random sampling or a pseudorandom sampling. With the nonce k, a curve point (u, v) can be determined using:

$$(u,v) \leftarrow [k]P \quad (1)$$

In this regard, determining the curve point (u, v) involves an ECSM of the nonce k and the base point P.

The ECDSA signature, provided by the pair (r, s), can be determined using:

$$r \leftarrow u \bmod n \quad (2)$$

$$s \leftarrow k^{-1}(H(m)+rx) \bmod n \quad (3)$$

where H is a hash function (e.g., secure hash algorithm (SHA) such as SHA-1 or SHA-2), H(m) is a hashed message, and ← denotes an assignment operator (e.g., r is assigned the value u mod n). It is noted that Equation (3) is a linear equation.

Equations (2) and (3) provide relations that are satisfied by ECDSA signatures. Equation (3) may be rewritten to solve for the nonce k:

$$k=(H(m)s^{-1}+rs^{-1}x) \bmod n \quad (4)$$

By setting $h=H(m)s^{-1}$ and $c=rs^{-1}$, Equation (4) may be rewritten as $h+cx=k \bmod n$. If information about the nonce k leaks or can be determined, then that information also leaks information (e.g., translates to information) about the private key x. In some cases, information leakages associated with the nonce k may result from the ECSM operation performed in Equation (1). If an adversary were to collect information about the nonce k to determine at least partial information about the nonce k, such as one or more most significant bits (MSBs) of the nonce k, the adversary may be able to utilize h, c, and the information about the nonce k to determine the nonce k and, in turn, the private key x. In some cases, information about the private key x may be determined by solving linear equations having the form provided by Equation (4).

The adversary may attack a device that uses ECDSA to cause the device to divulge the private key x by the device for ECDSA signing. With knowledge of the private key, the adversary may use the private key for ECDSA signing (e.g., to forge signatures) and thus be able to impersonate the attacked device (i.e., the authentic holder of the private key). In some cases, to cause the device to divulge information associated with the private key, the adversary may attack using a category of attacks known as side-channel attacks. Side-channel attacks are known as such because they do not directly involve an attempt at recovering or accessing the secret key itself, but instead rely on collecting information leakages and determining the secret key based on the collected information leakages. In some cases, the ECSM operation performed in Equation (1) may leak information associated with the nonce k that may be collected by the adversary during side-channel attacks.

An example of a side-channel attack is a lattice attack that uses the position that has a first bit value of one. In a lattice attack, information about the most significant bit of the nonce k is leaked unless countermeasures are taken. In such a lattice attack, the adversary may measure a power profile (e.g., also referred to as a power trace or a power signature) for each iteration of ECDSA to obtain information about a first one (e.g., the MSB) of the nonce k used for that iteration. For example, for a given message m to be signed, a signing entity (e.g., the sender/signer of the message) uses the private key x to determine/generate a signature (r, s) and return the signature. In this example, for a series of messages $m_1, m_2, \ldots, m_n$, a signature $(r_1, s_1)$ is used to sign the message $m_1$, a signature $(r_2, s_2)$ is used to sign the message $m_2$, a signature $(r_n, s_n)$ is used to sign the message $m_n$, and so forth. By monitoring (e.g., as part of the lattice attack) the power profile of the signing entity during each computation of a respective signature (r, s) for each message, the adversary may determine information about the nonce k (e.g., information about the MSB of the nonce k). From this information, the adversary may generate a series of linear equations based on Equation (4) and the adversary's knowledge of the messages $m_1, m_2, \ldots, m_n$, the signatures $(r_1, s_1)$, $(r_2, s_2), \ldots, (r_n, s_n)$, and the leaked information about the nonce k. In this regard, the adversary needs to collect enough information related to the signed messages to assemble enough leaks and corresponding equations to attempt to determine the private key x.

FIG. 2 illustrates information collected by an adversary as part of an attack (e.g., a lattice attack). The adversary collects a set of data formed of $\{m_i, r_i, s_i, leak_i\}$ where $1 \leq i \leq n$ for integer i. In this regard, for a given value of i, the message $m_i$, the signature $(r_i, s_i)$ of the message $m_i$, and leaked information $leak_i$ associated with the nonce k can be collected by the adversary. In an aspect, the adversary may determine the $leak_i$ by performing a power analysis on the signing entity to obtain a power profile while the signing entity performs a signing operation (e.g., an ECDSA signing operation) on the message $m_i$ to determine the signature $(r_i, s_i)$ of the message $m_i$. The $leak_i$ may be determined based on the power profile. In some cases, the power profile may be associated with the ECSM operation performed in Equation (1). A linear equation taking the form of Equation (4) can be built for each set of data $\{m_i, r_i, s_i, \text{leak}_i\}$. The adversary may collect a number of data sets appropriate to build a corresponding number of linear equations to attempt to solve for the private key x.

In some embodiments, to mitigate leakage information associated with ECDSA signing operations (e.g., ECSM operations of the ECDSA signing operations), multiple signing operations may be performed for a given message m to be signed, in which only one of the signing operations is associated with a true signature (r, s) and thus associated with a true nonce k. The remaining signing operations are associated with decoy signatures and leaked information that provide information associated with decoy nonces. In this regard, information associated with the true nonce and the decoy nonce(s) leaked with each signing operation (e.g., each with a respective message m, returned signature (r, s), and leaked information about k) is not prevented and instead may be leveraged to mitigate/obscure determination of the private key x. As further described below, such an approach makes building, by the adversary, of an appropriate system of linear equations to determine the private key x exponentially more difficult relative to a case in which no countermeasures are taken. Such an approach is in contrast to other approaches that address lattice attacks by stopping information leakage about the nonce k, such as by computational or physical mechanisms. In an embodiment, the approach to utilize multiple ECDSA signing operations for each message may be used alone or together with approaches that aim to stop information leakage.

FIG. 3 provides pseudocode for facilitating digital signature information leakage mitigation in accordance with an embodiment of the disclosure. The pseudocode provides operations to be performed in response to an ECDSA generation request for signing a message m and using the private key x. In some aspects, the pseudocode may be implemented by fixed function hardware, by code executing on hardware resources, and/or by a combination of fixed function hardware and programmable hardware. In an embodiment, any one of the computing devices 105, 110, and/or 115 may facilitate digital signature information leakage mitigation through implementation of the pseudocode. A computing device that is performing a signing operation (e.g., ECDSA signing operation) may be referred to as a signing entity.

A random number denoted as "order" may be determined/generated (e.g., by a random number generator of signing entity). In an aspect, the random number may be a true random number or a pseudorandom number. The "order" is indicative of an order in which to perform two ECDSA signing operations. A decoy message m' (e.g., also referred to as a fake message or a dummy message) may be generated by applying a hash function on the message m as denoted by m'=HASH(m). A decoy private key x' (e.g., also referred to as a fake private key or a dummy private key) may be generated by applying a hash function on the private key x as denoted by x'=HASH(x). Each of x' and m' has the same number of bits as x and m, respectively.

Two ECDSA signing operations are performed. One ECDSA signing operation is performed with (x, m) and the other is performed with (x', m'). The signing operations are performed in a random order, such as according to a random call order. This random order is indicated by the generated random number denoted as "order". In FIG. 3, if the value of "order" is 0, a first ECDSA signing operation is performed based on the private key x and the message m to obtain a signature (r, s) (e.g., also referred to as a true signature). After the first ECDSA signing operation is performed, a second ECDSA signing operation is performed based on the decoy private key x' and the decoy message m' to obtain a signature (r', s') (e.g., also referred to as a decoy signature). If the value of "order" is 1, the first ECDSA signing operation is performed based on the decoy private key x' and the decoy message m' to obtain the decoy signature (r', s'). After the first ECDSA signing operation is performed, the second ECDSA signing operation is performed based on the private key x and the message m to obtain the true signature (r, s). After the two ECDSA signing operations are performed, the true signature (r, s) is returned in response to the ECDSA generation request.

In some aspects, generation of a decoy private key x' is optional. When a decoy private key x' is not used, each instance of x' in FIG. 3 can be replaced with x. As an example, a device may be operated (e.g., selectively operated or fixedly operated) in a unique device secret (UDS) mode. In the UDS mode, the private key x is a fixed value unique to the device and may be referred to as a UDS key. In the UDS mode, the ECDSA function uses the unique device secret key and does not accept other keys, such as a decoy private key, as valid inputs. In other modes, a decoy private key x' may (e.g., but need not in some implementations) be generated/used for ECDSA.

FIG. 4 illustrates information that may be collected by an adversary as part of an attack (e.g., a lattice attack) when the pseudocode of FIG. 3 is implemented in accordance with an embodiment of the disclosure. The adversary collects a set of data formed of $\{m_i, r_i, s_i, \text{leak}_{i2}\}$ where $1 \leq i \leq n$ for integer i. With reference to FIG. 3, for a given value of i, the adversary may collect the message $m_i$, the signature $(r_i, s_i)$ of the message $m_i$, leaked information $\text{leak}_{i1}$ associated with the first ECDSA signing operation, and leaked information $\text{leak}_{i2}$ associated with the second ECDSA signing operation performed after the first signing operation. In some cases, the adversary may determine $\text{leak}_{i1}$ based on a power profile associated with the first ECDSA signing operation and $\text{leak}_{i2}$ based on a power profile associated with the second ECDSA signing operation. These power profiles may be associated with ECSM operations performed by the signing entity during the ECDSA signing operations. Depending on the "order" in FIG. 3, one of the leaked information $\text{leak}_{i1}$ or $\text{leak}_{i2}$ is leaked information pertaining to a nonce k (e.g., also referred to as a true nonce) whereas the remaining of $\text{leak}_{i1}$ or $\text{leak}_{i2}$ is leaked information pertaining to a decoy nonce k' (e.g., also referred to as a fake nonce). In this regard, depending on the "order", one of $\text{leak}_{i1}$ or $\text{leak}_{i2}$ is a true leak associated with the nonce k and the other is a decoy leak associated with the decoy nonce k'.

This approach of utilizing two ECDSA signing operations causes the adversary to generate a pair of equations for each message submitted, which will result in two leaks that are indistinguishable from each other as which was for computing (r,s) and which for (r',s'). In this regard, for each set of data $\{m_i, r_i, s_i, \text{leak}_{i1}, \text{leak}_{i2}\}$, two linear equations taking the form of Equation (4) can be built. For any given pair of linear equations, the adversary has no way to determine which one of $\text{leak}_{i1}$ or $\text{leak}_{i2}$ is the true leak and which one is the decoy leak. For the adversary to successfully solve for the correct nonce k, the adversary needs to choose the correct equation (e.g., the equation associated with the true leak) at each try/iteration for n trials (e.g., with each trial involving two signing operations), which has $2^n$ complexity. In this regard, to perform the lattice attack, the adversary needs to identify, out of a possible $2^n$ possible paths, the one path that is composed of only true leaks. FIG. 5 illustrates information that may be collected by an adversary as part of an attack (e.g., a lattice attack) with true leaks circled in accordance with an embodiment of the disclosure. The uncircled leaks are decoy leaks. FIG. 6 illustrates information that may be collected by an adversary as part of an attack (e.g., a lattice attack) with true leaks circled in accordance with an embodiment of the disclosure. In this regard, FIGS. 5 and 6 each illustrate (a portion of) one of the $2^n$ possible paths. As an example, for n=1000, the adversary has to select the correct 1000 equations to solve for the private key x. The probability of selecting a correct equation in each trial is ½. The probability of selecting 1000 correct equations is $½^{1000}$.

As such, having two ECDSA signing operations performed for each message makes ECDSA resilient to a lattice attack. Further in this regard, although the foregoing describes embodiments in which two signing operations are performed for each message, in other embodiments more than two signing operations (e.g., using a corresponding number of decoy messages, decoy private keys, and/or other decoy values) may be performed for each message to further add resilience (e.g., by further reducing a probability that the adversary is able to identify only the true leaks to build the correct set of linear equations for solving for the private key x). As an example, for a third signing operation, the true message may be used to determine (e.g., deterministically derive) a second decoy message (e.g., denotable as m") and, when a fake private key is to be used (e.g., in an non-UDS mode), the true private key x may be used to determine (e.g., deterministically derive) a second decoy private key (e.g., denotable as x"). In these embodiments, one or more random numbers may be generated to determine an order in which to perform the more than two signing operations.

In some aspects, the decoy message m' and the decoy private key x' (when used) are deterministic and not random. The decoy message m' and the decoy private key x' may be deterministic based on (e.g., derived from) the true message m and the true private key x. In FIG. 3, by way of non-limiting example, the decoy message m' is deterministic by applying a hash function to the message m, and the decoy private key x' is deterministic by applying a hash function to the private key x. Other manners (e.g., other than applying hash functions) by which to obtain the decoy message m' deterministically (e.g., from the true message) and the decoy private key x' deterministically (e.g., from the private key x) may be used. It is noted that the changes to m and x to obtain m' and x' cannot be a simple bit position shifting (e.g., of m to obtain m' or of x to obtain x'), as a shifted bit pattern may provide too much correlation with the true power profile (e.g., the true leak), and thus still provide a useful leak.

With reference to the true and decoy leaks as identified in FIG. 6, using a deterministic m' and x' derivation from m and x, if $m_1=m_2=m_3$, the decoy leaks are not random and are instead one value. In this regard, if $m_1=m_2=m_3$, the true leaks $leak_{12}=leak_{22}=leak_{32}$ and the decoy leaks $leak_{11}=leak_{21}=leak_{31}$. In other words, in the power analysis performed by the adversary, each time the same message is submitted, each true power signature will be the same as each other and each decoy signature will be the same as each other.

Such a deterministic approach for determining the decoy private key x' and the decoy message m' is in contrast to use of a random number to determine the decoy private key x' and/or the decoy message m'. If a random number were to be used to determine the decoy message m' and the decoy private key x', the adversary may be able to decompose the problem into a linear problem by causing the signing entity to sign the same message m using the same private key x multiple times. A power profile associated with signing the true message m remains consistent each time the true message m is signed, whereas different power profiles are generated from signing different (randomly generated) decoy messages m' using different (randomly generated) decoy private keys x'. As such, by performing a power analysis, the adversary is able to identify the power profile associated with signing the true message m using the true private key. The adversary may then be able to select the correct linear equations to use to evaluate for the true private key x. For example, with reference to the true and decoy leaks as identified in FIG. 6, for randomly generated decoy private key x' and/or the decoy message m', if $m_1=m_2=m_3$, the true leaks $leak_{12}=leak_{22}=leak_{32}$ whereas the decoy leaks $leak_{11}$, $leak_{21}$, $leak_{31}$ are not equal (e.g., have a generally negligible probability of being equal).

In some embodiments, information leakage mitigation may be applied for ECIESs. The foregoing description pertaining to information leakage mitigation in relation to ECDSAs generally applies to ECIESs, with examples of differences and other description provided herein. As an example, keys may be exchanged via Elliptic-Curve Diffie-Hellman (ECDH) (e.g., one pass ECDH). Since encryption of a message may be performed by a sender using a public key and decryption of the encrypted message may be performed by a receiver using a corresponding private key, an adversary may decrypt encrypted messages sent by the attacked device if the adversary has knowledge of the secret key of the attacked device.

In an aspect, information leakage mitigation may be used to address side-channel attacks, such as differential power analysis (DPA) attacks, on ECIES. The adversary may perform a DPA applied to an ECSM operation Q=dP for fixed d and many different values of P over many protocol runs. For example, the adversary may desire to recover a secret/private key x from a device and may know a public key y that corresponds to the secret key x. The adversary may use ECIES and the public key y to generate a message m and provide the message m to the device, which the device may decrypt (e.g., using an ephemeral public key also provided by the adversary). The adversary may observe the power profile during decryption by the device and, over a number of protocol runs, compile leaked information.

Figures 7, 8:
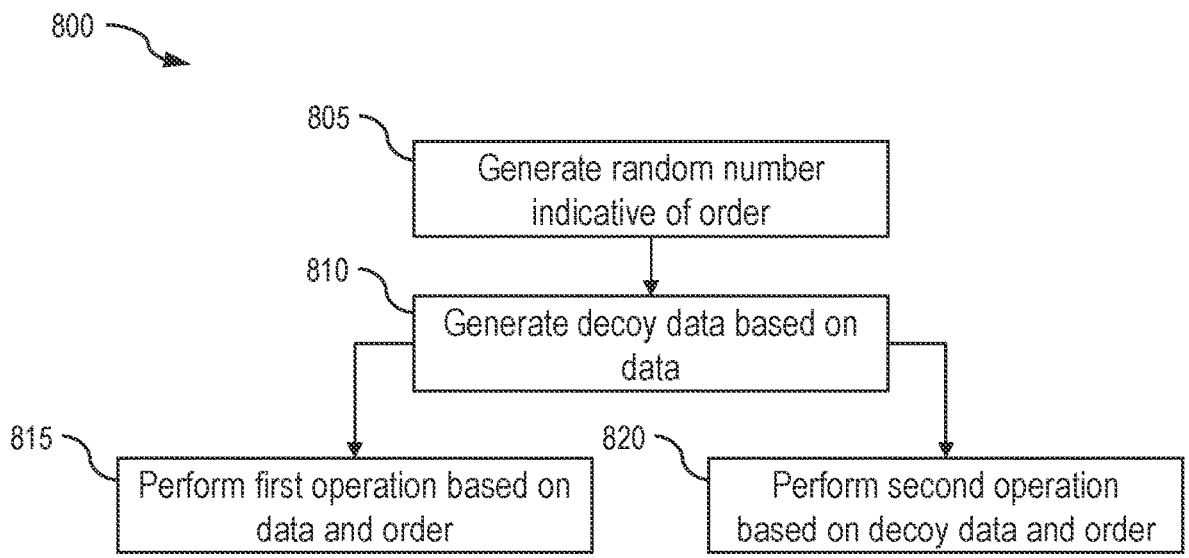
FIG. 7 provides pseudocode for facilitating information leakage mitigation associated with elliptic curve decryption in accordance with an embodiment of the disclosure.
FIG. 8 illustrates a flow diagram of an example process for facilitating information leakage mitigation associated with elliptic curve operations in accordance with an embodiment of the disclosure.

FIG. 7 provides pseudocode for facilitating information leakage mitigation for ECIES in accordance with an embodiment of the disclosure. The pseudocode provides operations to be performed in response to an ECIES decryption request for using a private key x and ephemeral public key R to decrypt an encrypted message to obtain a message m. In some aspects, the pseudocode may be implemented by fixed function hardware, by code executing on hardware resources, and/or by a combination of fixed function hardware and programmable hardware. A random number denoted as "order" is determined/generated (e.g., by a random number generator). The "order" is indicative of an order in which to perform two ECIES decryption operations. A decoy private key x' may be generated by applying a hash function on the private key x as denoted by x'=HASH(x). A decoy ephemeral public key R' may be generated based on the ephemeral public key R. In some aspects, as provided in FIG. 8, the decoy private key m' and the decoy ephemeral public key R' are deterministic and not random.

Two ECIES decryption operations are performed. One ECIES decryption operation is performed with (x, R) and the other is performed with (x', R'). The decryption operations are performed in a random order, such as according to a random call order. This random order is indicated by the generated random number denoted as "order". In an aspect, the random number may be a true random number or a pseudorandom number. In FIG. 7, if the value of "order" is 0, a first ECIES decryption operation is performed based on the private key x and the ephemeral public key R to obtain a message m. After the first ECIES decryption operation is performed, a second ECIES decryption operation is performed based on the decoy private key x' and the decoy ephemeral public key R' to obtain a decoy signature m'. If the value of "order" is 1, the first ECIES decryption operation is performed based on the decoy private key x' and the decoy ephemeral public key R' to obtain the decoy message m'. After the first ECIES decryption operation is performed, the second ECIES decryption operation is performed based on the private key x' and the ephemeral public key R to obtain the message m. In some cases, the decoy ephemeral public key R' may be not a valid point. After the two ECIES decryption operations are performed, the message m is returned in response to the ECIES decryption request.

In some aspects, generation of a decoy private key x' is optional. When a decoy private key x' is not used, each instance of x' in FIG. 7 can be replaced with x. As an example, a device may be operated (e.g., selectively operated or fixedly operated) in a UDS mode. In the UDS mode, the ECIES function uses the unique device secret key and does not accept other keys, such as a decoy private key, as valid inputs. In other modes, a decoy private key x' may (e.g., but need not in some implementations) be generated/used for ECIES.

For a given ECIES decryption request, the adversary may obtain one power profile for each of the two ECIES decryption operations. In this regard, the adversary captures two power profiles for each protocol run, which cannot be distinguished from each other as to which is true and which is the decoy. These power profiles may be associated with ECSM operations performed by the attacked device during the ECIES decryption operations. Depending on the "order" in FIG. 7, leaked information associated with one of the ECIES decryption operations pertains to the private key x and the ephemeral public key R whereas the remaining leaked information is associated with the other of the ECIES decryption operations pertains to the decoy private key x' (when used) and the decoy ephemeral public key R'. This causes the adversary to generate a pair of equations for each ECIES decryption request. As described above in relation to ECDSA, the adversary needs to choose only those equations associated with true leaks in order to determine the private key x.

FIG. 8 illustrates a flow diagram of an example process 800 for facilitating information leakage mitigation associated with elliptic curve operations in accordance with an embodiment of the disclosure. Note that one or more operations may be combined, omitted, and/or performed in a different order as desired. In an embodiment, the process 800 may be performed by any one of the computing devices 105, 110, and/or 115 of FIG. 1.

At block 805, a random number is generated. The random number sets an order in which to perform two elliptic curve operations. In an aspect, the two operations may include two elliptic curve multiplication operations, such as two ECSM operations. The ECSM operations may be performed as part of a signing operation (e.g., an ECDSA signing operation) or a coding operation (e.g., an ECIES decryption operation). For example, as shown in Equation (1), an ECDSA operation may include an ECSM operation to compute a curve point $(u, v) \leftarrow [k]P$, where k is the nonce and P is the elliptic curve base point. The curve point (u, v) in turn is used to determine an ECDSA signature (r, s) (e.g., according to Equations (2) and (3) provided above)

At block 810, decoy data is generated based on data. In an aspect, the decoy data is deterministically generated based on (e.g., deterministically derived from) the data. For example, the decoy data may be generated by applying a hash function on the data. In ECDSA, the data may include a message m and a private key x, and the decoy data may include a decoy message m' and a decoy private key x' (e.g., in modes other than a UDS mode). As non-limiting examples, the decoy message m' may be deterministically generated based on the message m, and the decoy private key x' (when used) may be deterministically generated based on the private key x. In ECIES, the data may include a private key x and an ephemeral public key R, and the decoy data may include a decoy private key x' (when used) and a decoy ephemeral public key R'.

At block 815, a first operation is performed based on the data. At block 820, a second operation is performed based on the decoy data. In some cases, the second operation may also be performed based on a portion of the data. For example, in ECDSA, the first operation may be performed based on the message m and the private key x'. The second operation may be performed based on the decoy message m' and the private key x' (e.g., a portion of the true data). An order in which to perform the first operation and the second operation is based on the random number generated at block 805. In an aspect, the random number may be a true random number or a pseudorandom number. The random number may have a 50% probability of being a 0 and a 50% probability of being a 1. In one case, if the random number is 0, the first operation is performed before the second operation. If the random number is 1, the second operation is performed before the first operation.

In an embodiment, the process 800 may be utilized to facilitate information leakage mitigation for ECDSA. The operations may be elliptic curve multiplication operations (e.g., ECSM operations) performed as part of ECDSA operations. With reference to block 810, the data includes a message m and the decoy data includes a decoy message m' generated based on the message m. In some cases, the data may also include a private key x and the decoy data may also include a decoy private key x'. In one aspect, a hash function may be applied to the message m to obtain the decoy message m', and/or a hash function may be applied to the private key x to obtain the decoy private key x'. At block 815, a first elliptic curve multiplication operation associated with a first ECDSA signing operation may be performed. The first ECDSA signing operation may be performed based on the message m and the private key x to sign the message m. At block 820, a second elliptic curve multiplication operation associated with a second ECDSA signing operation may be performed. The second signing operation may be performed based on the decoy message m' and the decoy private key x' to sign the decoy message m'. For example, an ECSM operation in an ECDSA signing operation may be to multiply a nonce (e.g., true nonce or decoy nonce) with an elliptic curve base point. In an embodiment, the process 800 may be implemented according to the pseudocode provided in FIG. 3.

In an embodiment, the process 800 may be utilized to facilitate information leakage mitigation for ECIES. The operations may be elliptic curve multiplication operations (e.g., ECSM operations) performed as part of ECIES operations. With reference to block 810, the data includes a private key x and/or an ephemeral public key R, and the decoy data includes a decoy private key x' generated based on the private key x and/or a decoy ephemeral public key R' generated based on the ephemeral public key R. At block 815, a first elliptic curve multiplication operation associated with a first decryption operation may be performed. The first decryption operation may be performed to decrypt based on the private key x and the ephemeral public key R to obtain a message m. At block 820, a second elliptic curve multiplication operation associated with a second decryption operation may be performed. The second decryption operation may be performed to decrypt based on the decoy private key x' and the decoy ephemeral public key R' to obtain a decoy message m'. For example, an ECSM operation in an ECIES operation may be to multiply a private key (e.g., true private key or decoy private key) and the ephemeral public key (e.g., true ephemeral public key or decoy ephemeral public key). In an embodiment, the process 800 may be implemented according to the pseudocode provided in FIG. 7.

Figure 9:
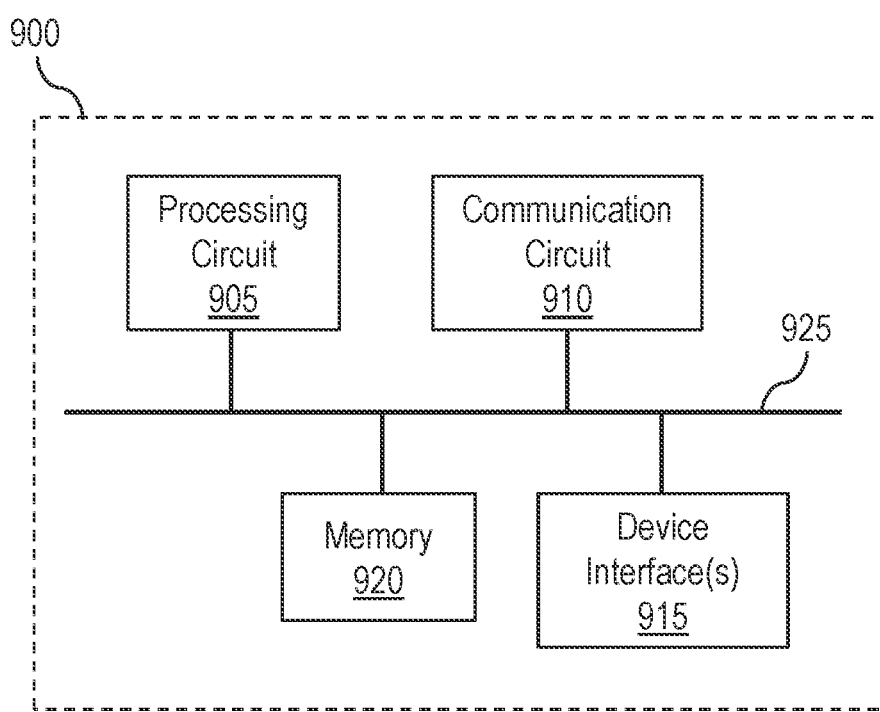
FIG. 9 illustrates an example computing device in which data signing, data encryption/decryption, and data communication may be implemented in accordance with one or more embodiments of the present disclosure.

FIG. 9 illustrates an example computing device 900 in which data signing, data encryption/decryption, and data communication may be implemented in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided. In an embodiment, the computing device 900 may be, may include, or may be a part of, any one of the computing devices 105, 110, or 115 of FIG. 1. In an aspect, the dashed box in FIG. 9 may represent a housing of the computing device 900.

The computing device 900 includes a processing circuit 905, a communication circuit 910, one or more device interfaces 915, a memory 920, and a bus 925. The bus 925 may be utilized to facilitate communication of data between the various components of the computing device 900.

The processing circuit 905 may execute machine readable instructions (e.g., software, firmware, or other instructions) stored in the memory 920. In an embodiment, the processing circuit 905 may execute the instructions to perform processes described herein, such as example processes provided in FIGS. 3, 7, and 8. The processing circuit 905 may be, may include, or may be a part of, one or more logic circuits in the computing device 900. Such logic circuits may be used to perform signature logic (e.g., ECDSA signing operations) and encryption/decryption logic (e.g., ECIES decryption operations). By way of non-limiting examples, the processing circuit 905 may apply hash functions, generate true random numbers and/or pseudorandom numbers (e.g., to select a nonce, to determine an order in which to perform elliptic curve operations, etc.), and perform elliptic curve operations. The processing circuit 905 may be implemented as one or more microprocessors, microcontrollers, application specific integrated circuits (ASICs), programmable logic devices (PLDs) (e.g., field programmable gate arrays (FPGAs), field programmable systems on a chip (FPSCs), or other types of programmable devices), codecs, and/or other processing devices.

The communication circuit 910 may be configured to handle, manage, or otherwise facilitate wired and/or wireless communication between various components of the computing device 900 and between the computing device 900 and another computing device. The communication circuit 910 may include a wireless communication circuit (e.g., based on the IEEE 802.11 standard, Bluetooth™ standard, or other wireless communication standard), cellular circuit, or other appropriate communication circuit. In some cases, the communication circuit 910 may be configured for a proprietary wireless communication protocol and interface. The communication circuit 910 may include, or may be in communication with, an antenna for wireless communication. In one embodiment, the communication circuit 910 may handle, manage, or otherwise facilitate wireless communication by establishing a wireless link to a handheld device, base station, wireless router, hub, or other wireless networking device.

The communication circuit 910 may be configured to interface with a wired network, such as via an Ethernet interface, power-line modem, Digital Subscriber Line (DSL) modem, Public Switched Telephone Network (PSTN) modem, cable modem, and/or other appropriate components for wired communication. Alternatively or in addition, the communication circuit 910 may support proprietary wired communication protocols and interfaces. The communication circuit 910 may be configured to communicate over a wired link (e.g., through a network router, switch, hub, or other network device) for purposes of wired communication. A wired link may be implemented with a power-line cable, coaxial cable, fiber-optic cable, or other cable or wires that support corresponding wired network technologies.

The device interface(s) 915 may include one or more output device interfaces and/or one or more input device interfaces. The output device interface(s) may include a graphics and/or audio driver card, graphics and/or audio driver chip, and/or graphics and/or audio driver processor. The output device(s) may enable the computing device 900 to provide output information to a user. For example, the output device(s) may include one or more display devices. The display device(s) may be utilized to display information to the user, such as web content in a web browser application running on the computing device 900. As an example, such web content may be encrypted by a server device and transmitted to the computing device 900. The computing device 900 may decrypt the encrypted web content and display the decrypted web content on a display device for viewing by the user.

The input device interface(s) may couple the computing device 900 to one or more input devices. The input device(s) may enable the user to provide (e.g., enter) data and commands to the computing device 900. The input device(s) may include, for example, an audio sensor, a microphone, a camera, a keyboard (e.g., a physical or virtual keyboard), a cursor control device (e.g., a mouse), a touchscreen, and/or other devices for providing user input to the computing device 900. In some cases, the input device may be integrated with and may also be a part of a display, such as in a touch screen display.

The memory 920 may be utilized to store information for facilitating operation of the computing device 900. By way of non-limiting example, the memory 920 may include non-volatile memory, such as read-only memory (ROM), programmable ROM (PROM), erasable programmable ROM (EPROM), electrically erasable programmable (EEPROM), flash, non-volatile random-access memory (NVRAM), etc. The memory 920 may include volatile memory, such as random-access memory (RAM), dynamic RAM (DRAM), static RAM (SRAM), etc. The memory 920 may store information such as instructions to be executed by the various components (e.g., the processing circuit 905) of the computing device 900, buffered information to be transmitted (e.g., by the communication circuit 910) such as encrypted data and/or other information.

The memory 920 may store various resources (e.g., software packages), such as an operating system, a user application(s), and security-related application(s). The operating system may manage resources (e.g., hardware resources) of the computing device 900 and provides common services for other programs (e.g., user application(s) and/or security-related application(s)). The user application(s) may include, by way of non-limiting example, a web browsing application, a word processing application, an electronic mail application, a point-of-sale application, and/or other applications. The security-related application(s) may include digital signature application(s) (e.g., for generating digital signatures, such as using ECDSA according to one or more embodiments) and encryption/decryption application(s) (e.g., for encrypting/decrypting data, such as using ECIES according to one or more embodiments). The security-related application(s) may include, by way of non-limiting examples, instructions to facilitate encryption and decryption of data, apply a hash function (e.g., SHA-1), public/private key pair generation, ECDSA authentication, true random number generation, and/or other security services.

Thus, in one or more embodiments, methods and systems according to the disclosure may be used with elliptic curve operations that rely on ECSM. The methods and systems may perform decoy computations using values deterministically derived from other values used in the operation (e.g., a secret key and a message). The decoy and true/real computation are performed in a random order. As such, for an adversary monitoring the computations, the computations may return power profiles that are different from each other and cannot be differentiated as to which is the decoy and which is true.

In one or more embodiments, a device is provided that performs an elliptic curve operation involving ECSM. The device may include control logic (e.g., as part of the processing circuit 905) that provides a deterministic decoy secret key associated with a true secret key (e.g., true private key) and a deterministic decoy message associated with a true message. The device may also include elliptic curve logic (e.g., as part of the processing circuit 905) that performs the elliptic curve operation (e.g., ECDSA signing, ECIES decryption). The control logic causes the elliptic curve logic to perform, in a random order, a true elliptic curve operation and a decoy elliptic curve operation and return a result of the true elliptic curve operation. The elliptic curve logic performs the true elliptic curve operation using the true secret key and the true message and performs the decoy elliptic curve operation using the decoy secret key and the decoy message.

In one or more embodiments, a method is provided for performing an elliptic curve operation involving ECSM. The method may include providing a deterministic decoy secret key associated with a true secret key and a deterministic secret message with a true message. The method may further include performing, in a random order, a true elliptic curve operation using the true secret key and the true message and a decoy elliptic curve operation using the decoy secret message. The method may further include returning a result of the true elliptic curve operation.

In one or more embodiments, a non-transitory medium is provided that stores computer executable code for causing a machine to perform the method above.

In one or more embodiments, a system includes the device recited above and a non-transitory medium that stores computer executable code for causing a machine to perform the method above.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

The invention claimed is:

1. A method comprising:
    generating second data based on first data, wherein the first data is associated with a message, wherein the second data is associated with a first decoy message, wherein the first data comprises a private key and the message, and wherein the second data comprises a first decoy private key and the first decoy message;
    generating third data based on the first data, wherein the third data comprises a second decoy private key and a second decoy message;
    performing a first elliptic curve operation based on the first data;
    performing a second elliptic curve operation based on the second data; and
    performing a third elliptic curve operation based on the third data, wherein the first elliptic curve operation, the second elliptic curve operation, and the third elliptic curve operation are performed in a random order.

2. The method of claim 1, further comprising generating one or more random numbers, wherein the random order to perform the first elliptic curve operation, the second elliptic curve operation, and the third elliptic curve operation is based on the one or more random numbers.

3. The method of claim 1, wherein the generating the second data comprises deterministically deriving the second data from the first data.

4. The method of claim 3, wherein the deterministically deriving comprises:
    applying a hash function to the message to obtain the first decoy message; and/or
    applying a hash function to the private key to obtain the first decoy private key.

5. The method of claim 3, wherein the first elliptic curve operation comprises a first elliptic curve digital signature algorithm (ECDSA) signing operation to sign the message, and wherein the second elliptic curve operation comprises a second ECDSA signing operation to sign the first decoy message.

6. The method of claim 5, wherein the first ECDSA signing operation comprises an elliptic curve multiplication of a nonce and an elliptic curve base point, wherein the first ECDSA signing operation is performed to obtain a signature, and wherein the signature is based on the message and the private key.

7. The method of claim 6, wherein the second ECDSA signing operation comprises an elliptic curve multiplication of a decoy nonce and an elliptic curve base point, wherein the second ECDSA signing operation is performed to obtain a decoy signature, and wherein the decoy signature is based on the first decoy message and one of the first decoy private key or the private key.

8. The method of claim 1, wherein the first elliptic curve operation comprises a first elliptic curve integrated encryption scheme (ECIES) decryption operation to decrypt encrypted data to obtain the message, and wherein the second elliptic curve operation comprises a second ECIES decryption operation to decrypt encrypted data to obtain the first decoy message.

9. The method of claim 8, wherein the first data further comprises an ephemeral public key, wherein the second data further comprises a decoy ephemeral public key deterministically derived from the ephemeral public key, wherein the first ECIES decryption operation comprises an elliptic curve multiplication operation of the private key and the ephemeral public key, and wherein the second ECIES decryption operation comprises an elliptic curve multiplication operation of the decoy ephemeral public key and one of the private key or the first decoy private key.

10. The method of claim 1, wherein the first data further comprises an ephemeral public key, wherein the second data further comprises a first decoy ephemeral public key, and wherein the third data further comprises a second decoy ephemeral public key.

11. A non-transitory machine readable storage medium including machine readable instructions which, when executed, cause one or more processors of a device to perform the method of claim 1.

12. A system comprising:
one or more processors; and
a non-transitory machine-readable medium comprising instructions stored therein, which when executed by the one or more processors, cause the one or more processors to perform operations, wherein the operations comprise:
generating second data based on first data, wherein the generating comprises deterministically deriving the second data from the first data, wherein the first data is associated with a message, wherein the second data is associated with a decoy message, wherein the first data comprises a private key and the message,
wherein the second data comprises a decoy private key and the decoy message, and
wherein the deterministically deriving comprises:
applying a hash function to the message to obtain the decoy message;
and/or
applying a hash function to the private key to obtain the decoy private key;
performing a first elliptic curve operation based on the first data; and
performing a second elliptic curve operation based on the second data, wherein the first elliptic curve operation and the second elliptic curve operation are performed in a random order.

13. The system of claim 12, wherein the operations further comprise generating a random number that indicates the random order to perform the first elliptic curve operation and the second elliptic curve operation.

14. The system of claim 12, wherein the first elliptic curve operation comprises a first elliptic curve digital signature algorithm (ECDSA) signing operation performed to obtain a signature, wherein the signature is based on the message and the private key, wherein the second elliptic curve operation comprises a second ECDSA signing operation performed to obtain a decoy signature, and wherein the decoy signature is based on the decoy message and the decoy private key.

15. A system comprising:
one or more processors; and
a non-transitory machine-readable medium comprising instructions stored therein, which when executed by the one or more processors, cause the one or more processors to perform operations, wherein the operations comprise:
generating second data based on first data, wherein the first data is associated with a message, wherein the second data is associated with a decoy message, wherein the first data comprises a private key and an ephemeral public key, and wherein the second data comprises a decoy private key and a decoy ephemeral public key;
performing a first elliptic curve operation based on the first data, wherein the first elliptic curve operation comprises a first elliptic curve integrated encryption scheme (ECIES) decryption operation to decrypt encrypted data to obtain the message, wherein the first ECIES decryption operation comprises an elliptic curve multiplication operation of the private key and the ephemeral public key;
performing a second elliptic curve operation based on the second data, wherein the second elliptic curve operation comprises a second ECIES decryption operation to decrypt encrypted data to obtain the decoy message, wherein the second ECIES decryption operation comprises an elliptic curve multiplication operation of the decoy private key and the decoy ephemeral public key, and wherein the first elliptic curve operation and the second elliptic curve operation are performed in a random order.

16. The system of claim 15, wherein the operations further comprise generating a random number that indicates the random order to perform the first elliptic curve operation and the second elliptic curve operation.

17. The system of claim 15, wherein the operations further comprise:
generating third data based on the first data; and
performing a third elliptic curve operation based on the third data, wherein the first elliptic curve operation, the second elliptic curve operation, and the third elliptic curve operation are performed in a random order.

18. The system of claim 15, wherein the decoy ephemeral public key is deterministically derived from the ephemeral public key.

* * * * *